April 7, 1970   D. L. MILLER   3,504,773
DUAL ARMATURE ELECTROMAGNETIC CLUTCH AND BRAKE
Filed Aug. 29, 1968
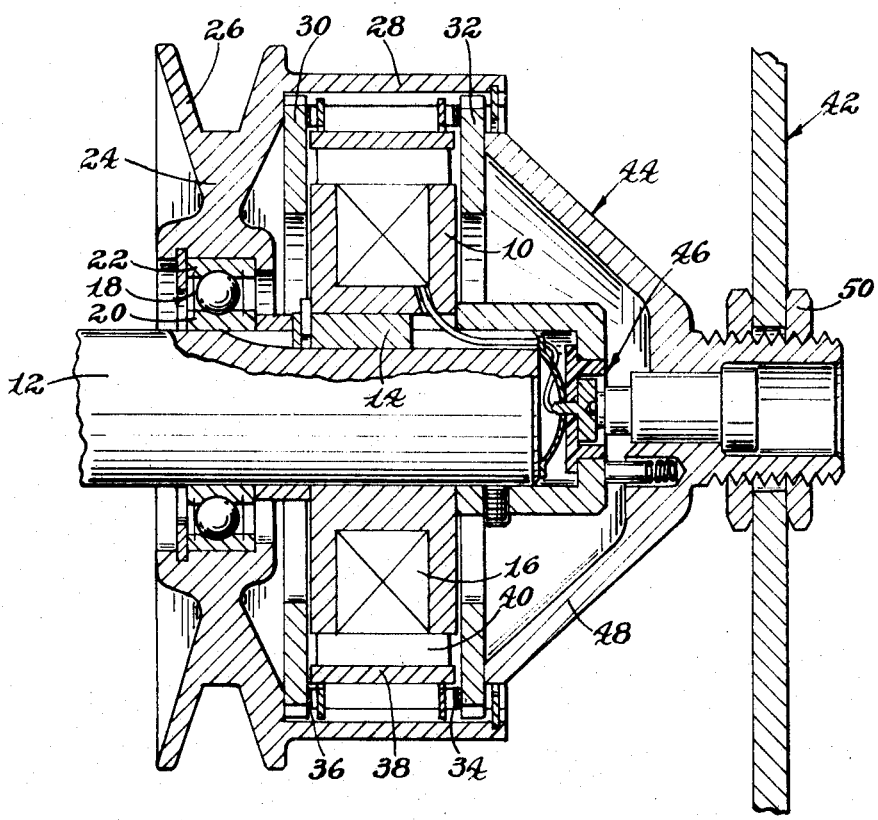
WITNESS:
INVENTOR.
Donald L. Miller
BY
Robert A. Benziger
ATTORNEY

United States Patent Office 3,504,773
Patented Apr. 7, 1970

3,504,773
DUAL ARMATURE ELECTROMAGNETIC
CLUTCH AND BRAKE
Donald L. Miller, Horseheads, N.Y., assignor to The
Bendix Corporation, a corporation of Delaware
Filed Aug. 29, 1968, Ser. No. 756,108
Int. Cl. F16d 11/04, 67/06
U.S. Cl. 192—18          4 Claims

ABSTRACT OF THE DISCLOSURE

An electromagnetic, coil-engaged, spring-released dual armature clutch. By selecting armature springs having different spring rates, the torque build-up is softer and, by placing one armature on either side of the coil to maintain a maximum friction radius, the total transmitted torque of the clutch is increased. As a safety feature, the armature biased by the stronger spring is then biased to bear against a stationary braking body to achieve braking whenever that armature is not in torque transmitting contact with the magnet body.

BRIEF SUMMARY OF THE INVENTION

As the popularity of garden-type tractors has increased, it has become increasingly more important to expand their utility without adversely affecting their cost. Since these tractors usually have power take-offs to accomplish garden chores, cut grass, and remove snow from sidewalks and driveways, an effective clutching arrangement whereby sufficient torque is transmitted to accomplish these tasks has become very important. Heretofore, manually-set power take-offs have sufficed, but the need is becoming apparent for clutching means which are more reliable from a safety viewpoint. Electromagnetic clutches are generally recognized as having many of the attributes necessary for garden tractor clutches; however, the torque transmitting capabilities are limited in proportion to the physical size of the clutch. It is, therefore, an object of this invention to provide an electromagnetic clutch having high torque transmitting capabilities and small size. Since a garden tractor would have a high center of gravity with an operator aboard, it would be necessary to provide an electromagnetic clutch having a "soft" engagement characteristic. This would be necessary to prevent sudden jarring of the tractor which might upset it. It is, therefore, an object of this invention to provide an electromagnetic clutch having a "soft" engagement characteristic. Since garden tractors would be used in association with cutting accessories, it is necessary to provide an accessory drive brake which rapidly and efficiently brakes any accessories when their driving relation is terminated. It is, therefore, a further object of this invention to provide an automatic braking action for the electromagnetic clutch having the above-described objects.

Other and further objects and advantages of the present invention will be obvious to the man skilled in the art.

BRIEF SUMMARY OF THE DRAWING

The drawing shows, in a single figure view, partially in section, the presently-preferred embodiment of my invention in the disengaged position.

DETAILED DESCRIPTION OF THE DRAWING

Referring to the drawing, a clutch and brake according to my invention is shown having a U-shaped magnet body 10 attached to input shaft 12 by key 14 for contemporaneous rotation therewith. An annular electromagnetic coil 16 is associated with the magnet body 10 and is so oriented with respect to the magnet body that current flow in the coil 16 induces an electromagnetic flux in the magnet body 10.

Axially-spaced from the magnet body 10 is a bearing, indicated generally by 18, having its inner race 20 journalled to the input shaft 12 for rotation therewith and having its outer race 22 attached to output member 24. The shaft 12 and member 24 have been termed input and output respectively, but their functional roles could readily be reversed by the man skilled in the art.

The output member 24 includes a pulley segment 26 radially-outward of bearing 18 and an axially-extending segment 28 which extends axially from one side of the magnet body 10 to the other side thereof, but which is radially-removed therefrom to permit independent rotation of said magnet body 10.

Slidably splined to the axially-extending portion 28 of the output member 24 are a pair of armatures 30 and 32. The armatures 30 and 32 are arranged on either side of the magnet body 10 and extend radially away from the axially-extending portion 28 of output member 24 so as to radially-overlap the magnet body 10. Springs 34 and 36 are arranged to resiliently-bias the armatures 30 and 32 away from the magnet body 10. The spring 34 is intentionally selected to be substantially stronger than the other spring 36.

Radially-intermediate the magnet body 10 and the axially-extending segment 28 of the output member 24 are a pair of annular shells which are substantially axially coextensive with the magnet body 10. The annulus 40 which is in radially-intimate contact with the magnet body 10 is formed of a non-permeable material while the annulus 38, which is radially remote from the magnet body 10, is formed of a permeable electron magnetic flux conducting material. During operation, the non-flux conducting annular shell 40 will cause flux generated in the magnet body 10 by the electromagnetic coil to cross the air gaps to the armatures 30 and 32 and cross back to the other annulus 38. Because of the dual armature design, the flux is required to cross four such air gaps.

Axially-spaced from the magnet body 10 on the side thereof in opposition to the output member 24 is the stationary housing structure, indicated generally by 42, which includes the brake means, indicated generally by 44, and the electrical connection means indicated generally by 46. The brake means is comprised of a braking member 48 and fastening means 50 to mount the braking member 48 on to the stationary frame. The braking member is arranged to be in intimate contact with the armature 32 which is biased away from the magnet body 10 by the stronger of the two springs, 34 and 36, for the sake of this description, spring 34. In this way, the output member 24 is braked under the influence of armature 32 and brake means 44 at all times, except when the electromagnetic coil has pulled both of the armatures into abutting contact with the magnet body 10 and permeable ring member 38.

In order to achieve the desired results, one of the springs 34 and 36 has been intentionally selected to be weaker than the other. Upon energization of the electromagnetic coil 16, the flux crossing the air gaps will exert a force tending to reduce these gaps. The gap maintained by the weaker spring, which for the sake of description can be thought to be spring 36, will be reduced to zero first. When this gap becomes zero, the initial driving relation will be established with the armature 30 in contact with the magnet body 10 and the permeable annulus 38. As will be obvious, the non-flux conducting annulus 40 could include a contact surface of a friction material to improve torque transmitting capacity. Instead of frictional contact, jaw teeth could also be used. In either contingency having established the initial contact, the clutch will begin to transmit torque. The electromagnetic flux force at the remaining air gaps will also increase because there will now be only two air gaps remaining, instead of the original four. This will allow the second armature 32 to be drawn into contact with the magnet body 10 and the permeable annulus 38, since the force available can now easily exceed the force of spring 34. When all air gaps have been reduced to zero, the final driving relationship will have been established. Since the net force acting on armature 30 is greater than that acting on armature 32, most of the transmitted torque will be transmitted through armature 30; however, since armature 32 also has a net force attracting it to the magnet body 10, it, too, is transmitting some torque, and the capacity of this elecromagnetic clutch will be greater than other electromagnetic clutches having comparable dimensions.

Upon de-energization of the coil 16, the electromagnetic flux level will begin to decay. As it decays, the electromagnetic flux forces holding the armatures 30 and 32 against the bias of their associated springs will also decay. Since spring 34 is presumed to be the strong spring, the armature 32 will be the armature first moved away from the magnet body 10 and the permeable annulus 38. As the armature 32 moves away, the electromagnetic flux will rapidly decay, allowing the release of armature 30 and providing for the prompt termination of the torque transmitting relationship. However, as soon as armature 32 moves away from the magnet body 10 and permeable annulus 38, it will be biased by spring 34 into the brake member 48 so that an immediate braking force is applied to the output means 24.

The device is, therefore, able to accomplish its stated objectives. Soft engagement is assured by the sequential armature engagement, and the provision of automatic braking following initial armature disengagement ensures that the output is rapidly and effectively braked.

I claim:

1. An electromagnetic clutch and brake comprising:
input means;
output means for torque transmitting coupling with said input means;
a pair of armature members slidably splined to one of said input means and output means and spaced apart from each other;
magnet body means attached to the other of said input means and output means and located intermediate said armature members;
non-permeable shell means in intimate relationship with said magnet body and intermediate said armature members;
permeable shell means in remote relationship with said magnet body and intermediate said armature members;
said armature members, permeable shell means and magnet body means operative when the input means is transmitting torque to the output means to form an electromagnetic flux conducting path;
first resilient means operative to bias one of said armature members away from said magnet body means;
second resilient means operative to bias the other of said armature members away from said magnet body means;
said first resilient means being selected to be substantially stronger than said second resilient means; and
brake means in cooperative association with the armature biased by said first resilient means and operative to apply a braking force to said armature when the armature is in its resiliently biased spaced-apart relationship with said magnet body.

2. The clutch and brake as claimed in claim 1 wherein said non-permeable shell means are radially-outward from said magnet body means and said permeable shell means are radially-outward from said non-permeable shell means and said permeable shell means are axially-coextensive with said magnet body means.

3. The clutch and brake as claimed in claim 2 wherein said armature members radially-overlap said permeable shell means and said magnet body means.

4. The clutch and brake as claimed in claim 1 wherein said brake means comprise a brake member fixedly attached by mounting means to a stationary frame and arranged in proximity to the armature biased by said first resilient means to contactively abut said armature whenever said armature is not in contact with said magnet body means.

References Cited

UNITED STATES PATENTS 2,950,795    8/1960    Fischer _____ 192—18.2 XR

BENJAMIN W. WYCHE III, Primary Examiner

U.S. Cl. X.R.

188—171; 192—84; 335—265